United States Patent
Seo et al.

(10) Patent No.: US 7,251,356 B2
(45) Date of Patent: Jul. 31, 2007

(54) METHOD FOR ESTIMATION OF FUNDAMENTAL MATRIX IN IMPLEMENTING A STEREO VISION

(75) Inventors: Jung-Kak Seo, Chungcheongbuk-Do (KR); Cheung-Woon Jho, Bucheon-Si (KR); Hyun-Ki Hong, Seoul (KR)

(73) Assignee: Chung-ang University Industry Academic Cooperation Foundation (KR)

( * ) Notice: Subject to any disclaimer, the term of this patent is extended or adjusted under 35 U.S.C. 154(b) by 805 days.

(21) Appl. No.: 10/703,425

(22) Filed: Nov. 10, 2003

(65) Prior Publication Data

US 2004/0213452 A1    Oct. 28, 2004

(30) Foreign Application Priority Data

Apr. 22, 2003   (KR) .................. 10-2003-0025540

(51) Int. Cl.
  *G06K 9/00*   (2006.01)

(52) U.S. Cl. ..................................................... 382/154
(58) Field of Classification Search ................ 382/154, 382/103, 199; 345/419, 420
See application file for complete search history.

(56) References Cited

U.S. PATENT DOCUMENTS 6,353,678 B1 *   3/2002   Guo et al. .................. 382/154
2004/0227820 A1 *   11/2004   Nister .................... 348/207.99

* cited by examiner

*Primary Examiner*—Vikkram Bali
(74) *Attorney, Agent, or Firm*—Dickstein Shapiro LLP (57) ABSTRACT

A method for estimation of a fundamental matrix by selecting sets of correspondence points is provided. According to the method, an entire image is divided into several sub-regions, and the number of the inliers in each sub-region and the area of each region is examined. The standard deviation are used as quantitative measures to select a proper inlier set. This method achieves a more precise estimation of the fundamental matrix than conventional method does.

10 Claims, 12 Drawing Sheets

METHOD FOR ESTIMATION OF FUNDAMENTAL MATRIX IN IMPLEMENTING A STEREO VISION

BACKGROUND OF THE INVENTION

1. Field of the Invention

The present invention relates to a method for estimation of fundamental matrix in implementing a stereo vision from two cameras. More particularly, the present invention relates to a method for estimation of fundamental matrix, wherein the inlier set is selected in order that the selected correspondence points are evenly distributed in the whole image. According to the method, the whole image is divided into several sub-regions, and the number of the inliers in each sub-region and the area of each region are examined.

2. Description of the Related Art

Stereo vision, a useful technique for obtaining 3-D information from 2-D images, has many practical applications including robot navigation and realistic scene visualization. Given a point in the one image, we find the corresponding point in the other image so that the two points are the projections of the same physical point in space. In this process, the fundamental matrix representing succinctly the epipolar geometry of stereo vision is estimated. The fundamental matrix contains all available information on the camera geometry and it can be computed from a set of correspondence points. Then, the matching process for finding correspondence point in the other image is conducted.

Hereinafter, the epipolar geometry is explained in detail.

Figure 1:
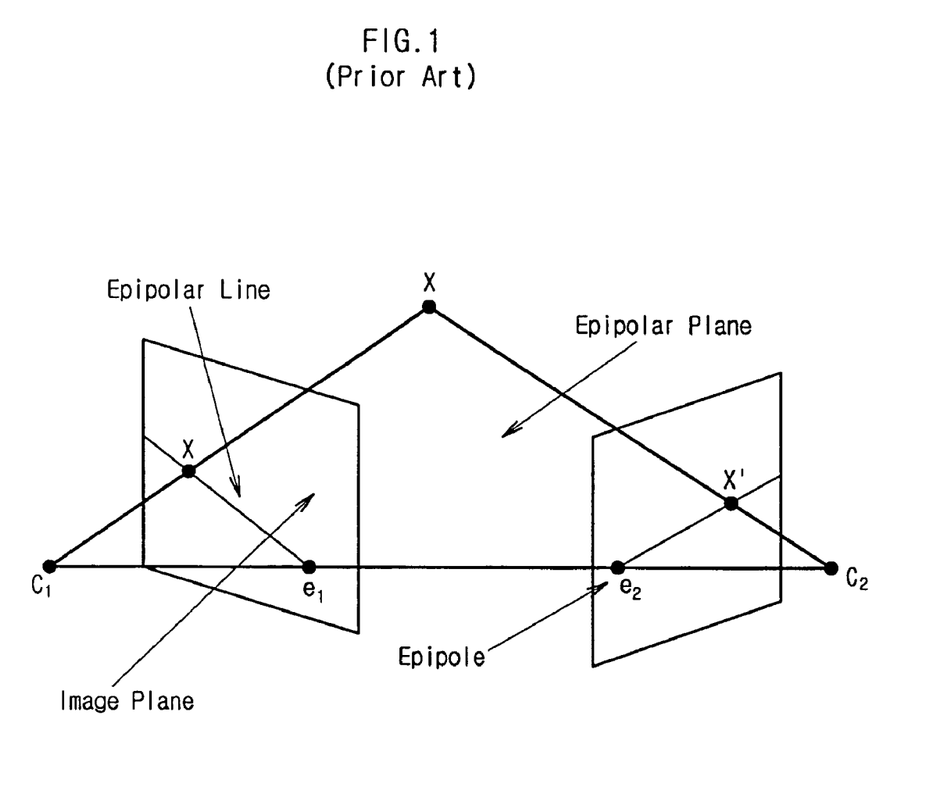
FIG. 1 is a diagram for explaining the epipolar geometry.

Epipolar geometry is a fundamental constraint used whenever two images of a static scene are to be registered. In the epipolar geometry, the relation between two images respectively obtained from different cameras may be explained with a correspondence of a point to a line, rather than a correspondence of a point to a point. Given a point in the one image, we find the corresponding point in the other image so that the two points are the projections of the same physical point in space. These two points are called as "correspondence point". The plane made by a point X, and two cameras is called as "epipolar plane". The intersection line made by the epipolar plane and the image plane is called as "epipolar line". The intersection point made by the image plane and the line linking two cameras is called as "epipole". Given a point in one image, corresponding point in the second image is constrained to lie on the epipolar line. FIG. 1 is a diagram for explaining the epipolar geometry. All the epipolar geometry is contained in the fundamental matrix.

The epipolar constraint can be written as following Equation 1:

$$x'^T F x = 0 \quad \text{[Equation 1]}$$

where, x and x' are the homogeneous coordinates of two correspondence points in the two images, and F is the fundamental matrix (3 by 3) that has rank 2, and since it is defined up to a scale factor, there are 7 independent parameters.

From the Equation 1, the fundamental matrix can be estimated linearly, given a minimum of 8 correspondence points between two images. Because the fundamental matrix contains the intrinsic parameters and the rigid transformation between both cameras, it is widely used in various areas such as stereo matching, image rectification, outlier detection, and computation of projective invariants.

Because the fundamental matrix can be estimated from the information of correspondence points, the influence of outlier which exists in the information of correspondence points should be reduced. It is important to select a proper inlier set for a more precise fundamental matrix.

In general, for an optimal solution satisfied in the given data set, wrong data may be sometimes an obstruction in finding the solution, if the data set comprises wrong data. Such wrong data which can be in a given data set are called as "outlier". Thus, for a precise solution, it is preferable to find a solution after such wrong data are eliminated. It is preferable to distinguish the wrong data from proper data based on a predetermined criterion. Such proper data are called as "inlier".

According to the prior art, the precision of the fundamental matrix much depends on the selection of inlier set. Therefore, it is important to eliminate the outlier due to the false matching in the information of correspondence points for finding a precise fundamental matrix. The Estimation of fundamental matrix is sensitive to the error, though it can be conducted from the correspondence point set. Therefore, it is important to select inlier set from the correspondence point set.

Several algorithms for the estimation of fundamental matrix are categorized into three methods: the linear method, the iterative method, and the robust method. The linear method and the iterative method use some points to estimate the fundamental matrix.

First, the linear approaches, such as Eight-Point Algorithm, estimate the fundamental matrix by using eight corresponding points. With more than eight points, a least mean square minimization is used, followed by the enforcement of the singularity constraint so that the rank of the resulting matrix can be kept in 2. These approaches have been proven to be fast and easy to implement, but they are very sensitive to image noise.

Second, the iterative methods are based on optimization criteria, such as the distance between points and epipolar lines, or the gradient-weighted epipolar errors. Although these methods are more accurate than the linear method, they are time consuming and much affected by the unavoidable outliers inherent in the given correspondence matches and the error on the point locations.

Finally, the robust methods such as LMedS(Least Median of Square) and RANSAC(Random Sampling Consensus), can cope with either outliers or bad point localization.

RANSAC uses a minimum subset for parameter estimation and the solution is given by the candidate subset that maximizes the number of consistent points and minimizes the residual.

According to the LMedS method, the correspondence point set wherein the median of distance error is least is selected.

However, according to the robust methods, different inlier set is selected whenever this method is conducted since the inlier set for finding the fundamental matrix is selected randomly. Thus, the obtained fundamental matrix is much affected by the selected inlier set. It is probable to estimate the fundamental matrix which has a large error. Further, it is computationally infeasible to consider all possible subsets, since the computation load grows exponentially according to the number of the inliers. Therefore, additional statistical measures are needed to derive the minimum number of sample subsets. In addition, because of the restrictive way of sampling the points randomly, the obtained fundamental matrix can be much changed by which points are selected.

SUMMARY OF THE INVENTION

As above-mentioned, several methods to estimate the fundamental matrix have been proposed for over two decades. The main difficulty in estimating the fundamental matrix stems from the unavoidable outliers inherent in the given correspondence matches. Because the outliers by a false match can severely disturb estimation of the fundamental matrix, the outliers should be identified and then rejected. The robust algorithms to solve the problems of errors on the point locations and mismatches have been actively studied up to now.

The present invention provides two novel quantitative measures to select a proper inlier set by considering the inlier distributions. This method is based on Least-Median-Squares(LMedS), which calculates the median of distances between points and epipolar lines for each fundamental matrix. In this process, LMedS eliminates many outliers, and then inliers and the fundamental matrix are obtained.

The first method divides an image uniformly into several sub-regions based on the number of the inliers. The standard deviation of the number of the inliers in each sub-region and the average value, which is the total number of the inliers divided by the number of sub-regions, are calculated. The obtained standard deviation represents the degree of the point distribution in each sub-region relative to the entire image. The obtained information is used as a quantitative measure to select the evenly distributed point set.

The second method uses the Delaunay triangulation connecting the inliers to decompose an image into non-uniform sub-regions, and the area of each sub-region is computed. The average area by dividing the area of the image by the total number of the triangles is calculated. Then, the standard deviation of the area of each sub-region and the average is used as a quantitative measure.

Using this method according to the present, the inlier set wherein the correspondence points are uniformly distributed may be selected, and more precise fundamental matrix may be obtained.

Accordingly, the object of the present invention is to provide a method for estimation of a fundamental matrix by selecting the set of correspondence points uniformly distributed in the whole image as an inlier set.

In order to accomplish such object, there is provided a method for estimation of a fundamental matrix by selecting a set of correspondence points in the camera images to obtain the relative geometrical information for the two cameras in implementing a stereo vision.

The method comprises the steps of:

(a) selecting a predetermined number of random correspondence points, and then obtaining an initial fundamental matrix by linear method;

(b) calculating an error of each correspondence point from the initial fundamental matrix, and obtaining the median value of the set of the calculated errors;

(c) iterating for predetermined times the steps of (a) and (b), and storing the initial fundamental matrix and the median value according to the initial fundamental matrix for each iteration;

(d) selecting the least median value and the larger median value ranged within predetermined extent, e.g., 10% of the least median value among the stored median value, and corresponding fundamental matrix;

(e) presetting a threshold value corresponding to the respective selected median value, and obtaining inlier sets corresponding to the respective median value using the corresponding threshold value and the initial fundamental matrix;

(f) selecting the inlier set wherein the standard deviation of the distribution of the inlier set is minimum; and (g) obtaining the fundamental matrix using the selected of inlier set.

As above-mentioned, in the method according to the present invention, the relation of the correspondence point x and x' in the respective camera images, and the fundamental matrix F is as following Equation 1:

$$x'^T F x = 0 \quad \text{[Equation 1]}$$

The number of random correspondence points to be selected for obtaining an initial fundamental matrix in step (a) may be preferably 7 or 8.

The error r of correspondence point in step (b) may be calculated according to the following Equation 2 as a distance error:

$$r = d(x, F^T x') + d(x', Fx) \quad \text{[Equation 2]}$$

where d(x, l) is the distance between a point x and a line l.

The number of iteration of steps (a) and (b) in the step (c) is preferably determined by the following Equation 3:

$$N = \log(1-P)/\log(1-(1-\epsilon)^q) \quad \text{[Equation 3]}$$

where, $\epsilon$ is the ratio of the outlier to all points;

q is the number of the sample points, preferably 7 or 8; and

P is the probability that these points are the inliers in sampling q points at N times.

For example, in case that every point is the inlier, P is 1. In general, P is near 1.

The threshold value in the step (e) may be obtained according to the following Equation 4:

$$\tau = 2.5 \times 1.4826[1+5/(p-q)]\sqrt{\text{Median}} \quad \text{[Equation 4]}$$

where, p is the number of correspondence points, q is the number of the sample points, preferably 7 or 8; and Median is the median value.

In step (f), the image is divided into sub-regions. The standard deviation means the distribution degree regading point density or area density of inlier sets in the sub-regions.

The standard deviation of the point density in sub-regions and an entire image can be used to evaluate whether the points are evenly distributed. The image is divided into the uniform sub-regions according to the number of the inliers by the following Equation 5. Then, the point density of sub-regions and that of the entire image are calculated.

The width ($W_s$) and the height ($H_s$) of the sub-region can be written as Equation 5:

$$W_s = W/\text{int}(\sqrt{N}) \quad \text{[Equation 5]}$$

$$H_s = H/\text{int}(\sqrt{N})$$

where,

N is the number of the inliers, and int(•) means conversion to integer,

W and H are the height and the width of the image.

Then, the standard deviation of point density that represents a degree of the point distribution in each sub-region relative to the entire image is calculated. The obtained information is used as a quantitative measure to select the evenly distributed point sets. The standard deviation of the point density is defined as following Equation 6:

$$\sigma_p = \sqrt{\frac{1}{S_N}\sum_{i=1}^{S_N}\left(P_{Ni} - \frac{N}{S_N}\right)^2} \quad \text{[Equation 6]}$$

where $S_N$ is the number of sub-regions,

N is the number of inliers, and $P_{Ni}$ is the number of inliers in the i-th sub-region.

In case of using the area density, the Delaunay triangulation connecting the inliers decomposes the image into non-uniform sub-regions. The Delaunay triangulation in 2-D consists of non-overlapping triangles where no points in the triangle are enclosed by the circumscribing circles of another triangle.

The average area can be obtained by dividing the area of the image by the number of the triangles. The standard deviation of the area of each sub-region and the average is used as the quantitative measure. The area of triangle is defined as following Equation 7:

$$A_\Delta = \frac{1}{2}|e_2|\left|v_2 - \frac{e_1^T e_2}{|e_2|}e_2\right| \quad \text{[Equation 7]}$$

where $v_i$ is the i-th vertex of the triangle, $e_1$ and $e_2$ are vectors, $e_1 = v_2 - v_1$, $e_2 = v_3 - v_1$.

The standard deviation of the area density is defined as following Equation 8:

$$\sigma_A = \sqrt{\frac{1}{N_T}\sum_{i=1}^{N_T}\left(A_i - A_{aver}\right)^2} \quad \text{[Equation 8]}$$

where, $A_i$ is the area of i-th triangle, $N_T$ is the number of triangles by Delaunay triangulation, and $A_{aver}$ is the average area (i.e., total area of whole image/the number of triangles).

BRIEF DESCRIPTION OF THE DRAWINGS

The above and other objects, features and advantages of the present invention will be more apparent from the following detailed description taken in conjunction with the accompanying drawings, in which:

FIG. 2b illustrates the distribution of corresponding points in the images of FIG. 2a.

FIG. 2c is a graph showing the epipolar errors with respect to the images of FIG. 2a.

DETAILED DESCRIPTION OF THE PREFERRED EMBODIMENTS

Hereinafter, a preferred embodiment of the present invention will be described with reference to the accompanying drawings.

Now, the experiment results from the method according to the present invention are explained.

EXPERIMENTAL EXAMPLE

The Influence of Distribution Form of Correspondence Point on the Error

In the process of estimation of the fundamental matrix, the fundamental matrix may be affected by errors in the correspondence points. Therefore, it is important to eliminate outliers.

According to the LMedS methods, the errors are arranged in the order, then the fundamental matrix wherein median value of the errors is least is selected. The error of correspondence is obtained using the Equation 2.

However, in the LMedS methods, it is not considered whether the camera information is well reflected in the correspondence points. Therefore, the median minimization approach always does not guarantee a precise solution.

Figure 2A:
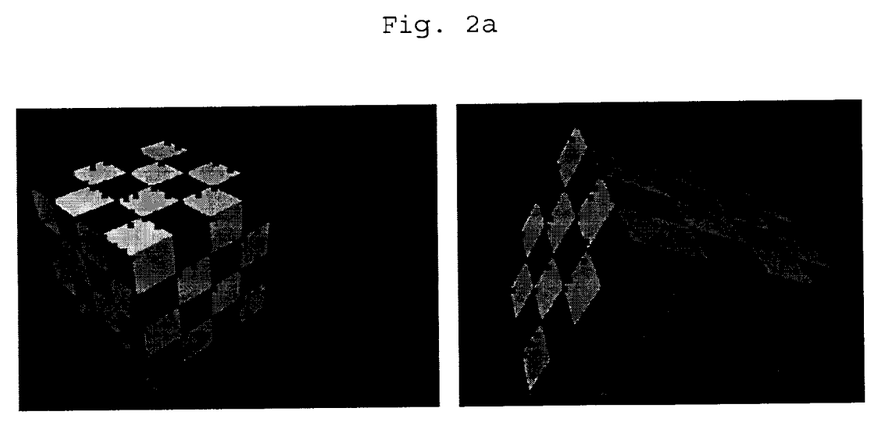
FIG. 2a illustrates the images from two cameras whose motions are same.

In order to show whether the evenly distributed point set is effective for the fundamental matrix estimation, we have simulated on two pairs of synthetic images from same camera motion as shown in FIG. 2a.

Figure 2B:
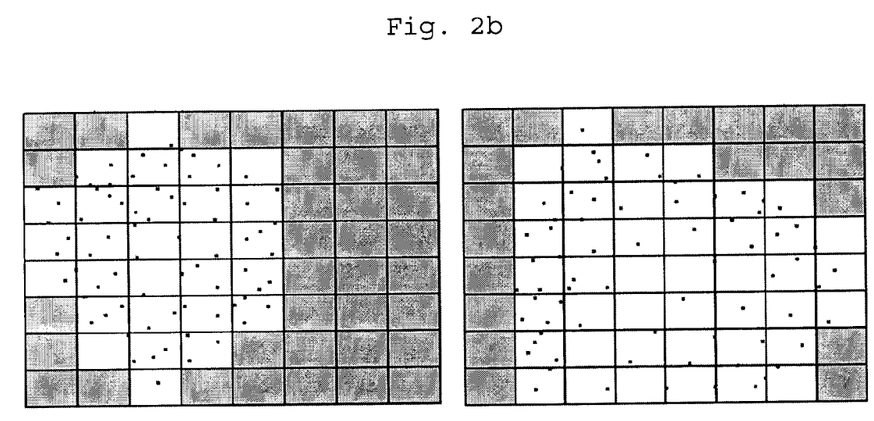
Figure 2C:
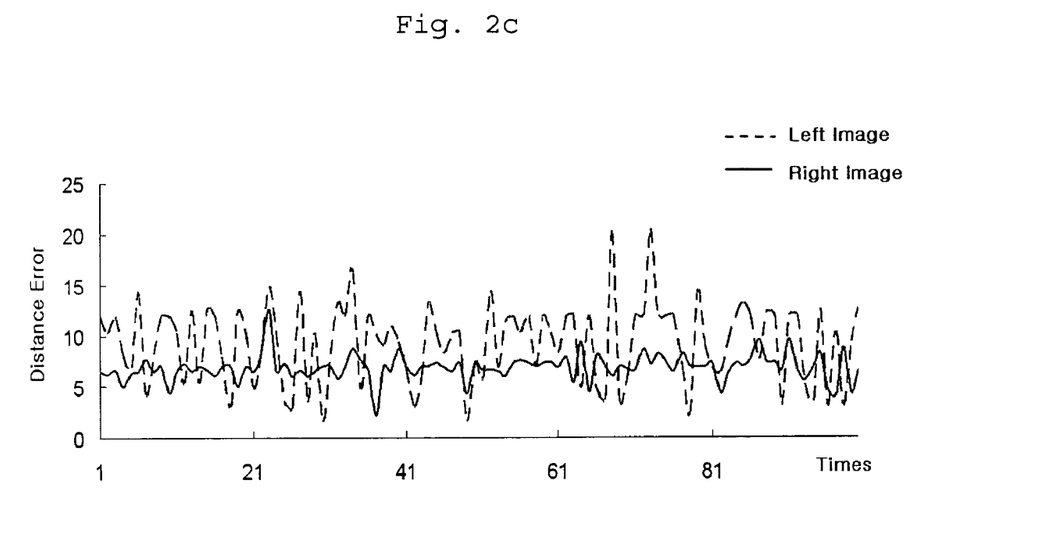

In the left image of FIG. 2a, correspondence points are mainly distributed on the left-sided region. In the right image of FIG. 2a, the points are evenly distributed. We have tested 100 times on each image by the LMedS method. FIG. 2b shows distribution of correspondence points. FIG. 2c shows the distance error graph for the obtained epipole relative to the real at each time, respectively. The dot line in blue and the solid line in red in FIG. 2c represent the distance error of the left image and the right images in FIG. 2a, respectively.

The simulation results show that if the evenly distributed inlier sets are detected, we can estimate a more precise fundamental matrix.

The present invention provides two quantitative methods to evaluate the distribution of the inliers, i.e., point density, and area density.

1. Point Density

The image is divided into the uniform sub-regions by Equation 5, and then we calculate the point density of sub-regions and an entire image. The width ($W_s$) and the height ($H_s$) of the sub-region can be calculated by the Equation 5.

The degree of evenly-distribution may be analyzed using the difference of correspondence points between the whole images and each sub-regions. If the number of sub-regions are same with the number of correspondence points, and there is only one correspondence point in each sub-regions, we can say that the correspondence points are most evenly distributed in the whole.

It is preferable to divide the whole image into sub-regions in the same shape of the whole image. For example, the shape of the whole image is rectangle, the sub-region is preferably formed in the shaped of rectangle.

Figure 3A:
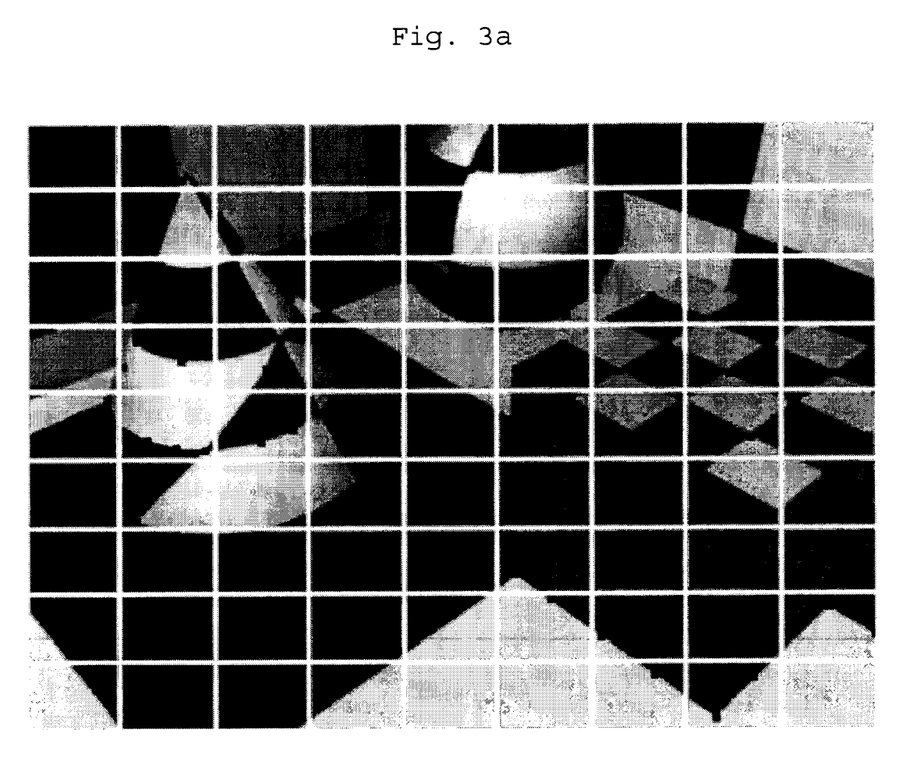
FIGS. 3a and 3b show sub-regions divided uniformly on the synthetic image and the real image, respectively, based on the point density.
Figure 3B:
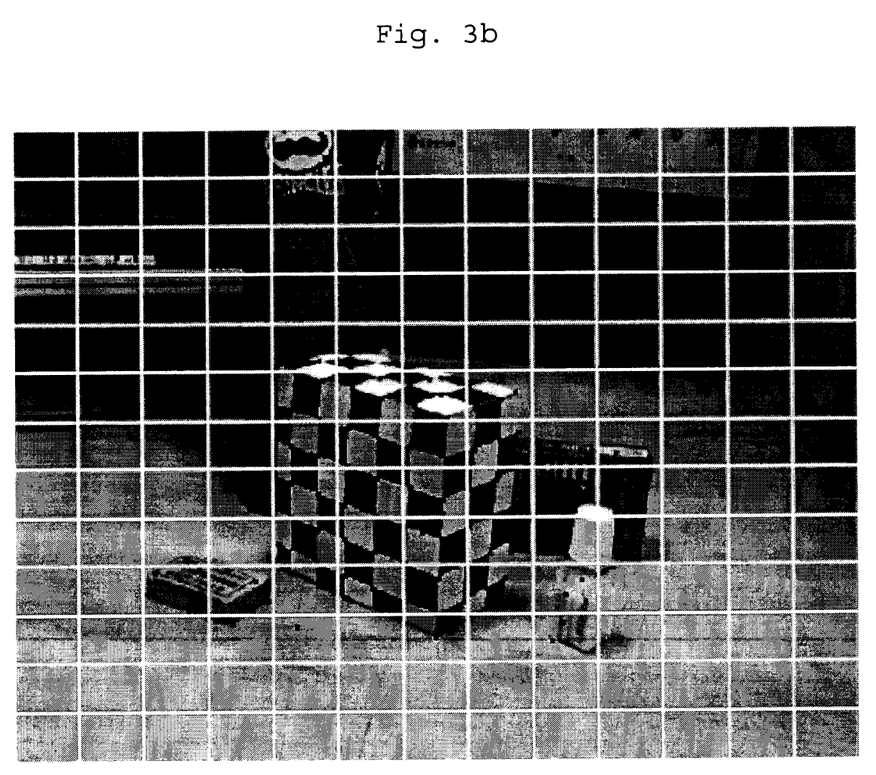

FIGS. 3a and 3b show sub-regions divided uniformly on the synthetic image and the real image, respectively.

Using the Equation 5, the size of the sub-regions is calculated. Then, the number of correspondence point is counted in each sub-regions, and point density and its standard deviation are calculated. The size of each sub-regions is uniform. Therefore, if it is assumed that the area of each sub-regions is 1, the standard deviation of point density is written as the Equation 6.

2. Area Density

Using the Delaunay triangulation, the distribution of area density is evaluated.

The entire image is segmented into several non-uniform sub-regions in shape of triangle which is formed with correspondence points. The area of each triangle, and the average area of triangle(i.e., total area of whole image/the number of triangles) are used.

Figure 4A:
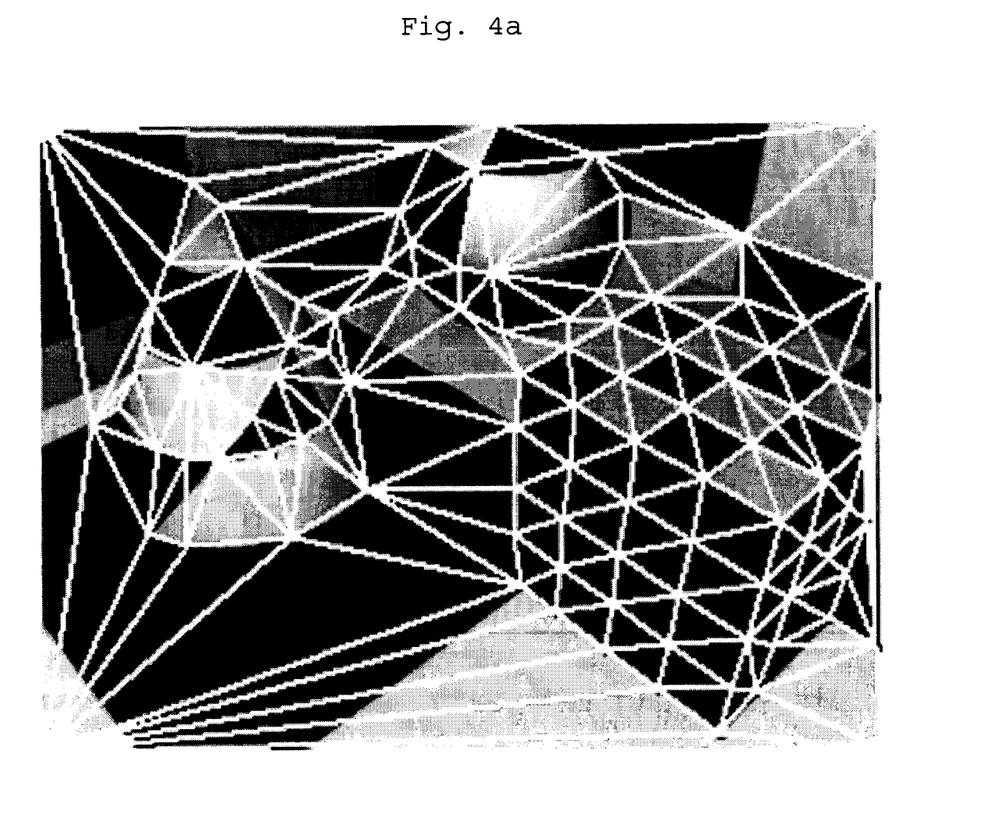
FIGS. 4a and 4b show sub-regions divided several non-uniformly based on the area density.
Figure 4B:
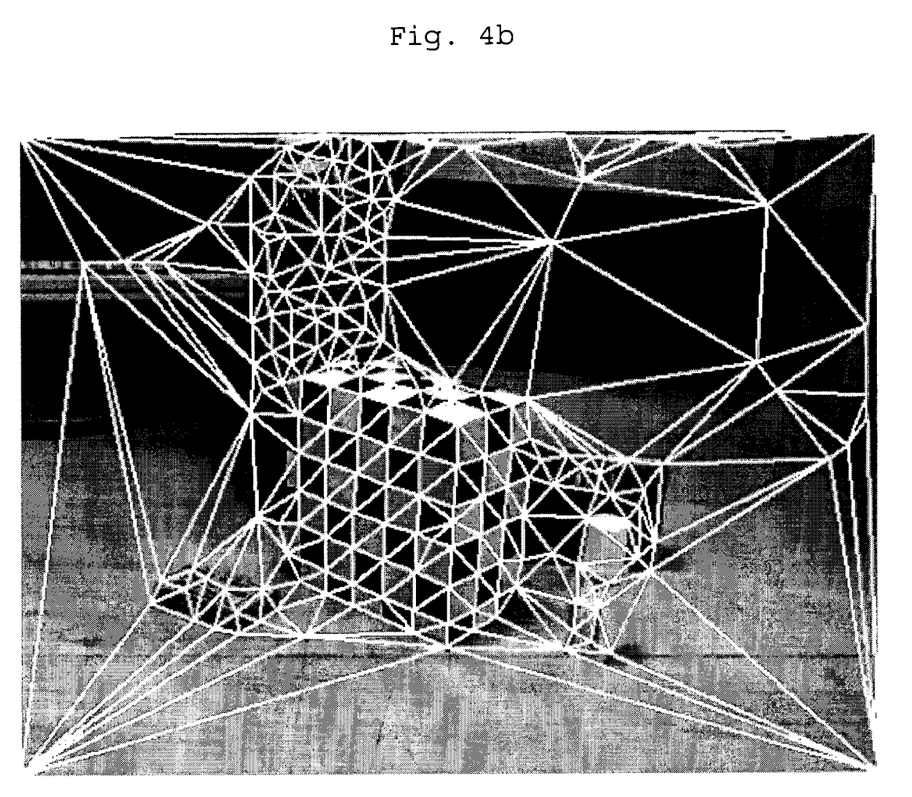

FIGS. 4a and 4b show that the entire image is segmented into several non-uniform sub-regions.

If the correspondence points are distributed uniformly, the average area and the area of each triangle is same. Thus, the degree of evenly-distribution may be analyzed using the standard deviation of area of each triangle. The area and the standard deviation is calculated using the Equations 7 and 8, respectively.

Figure 5:
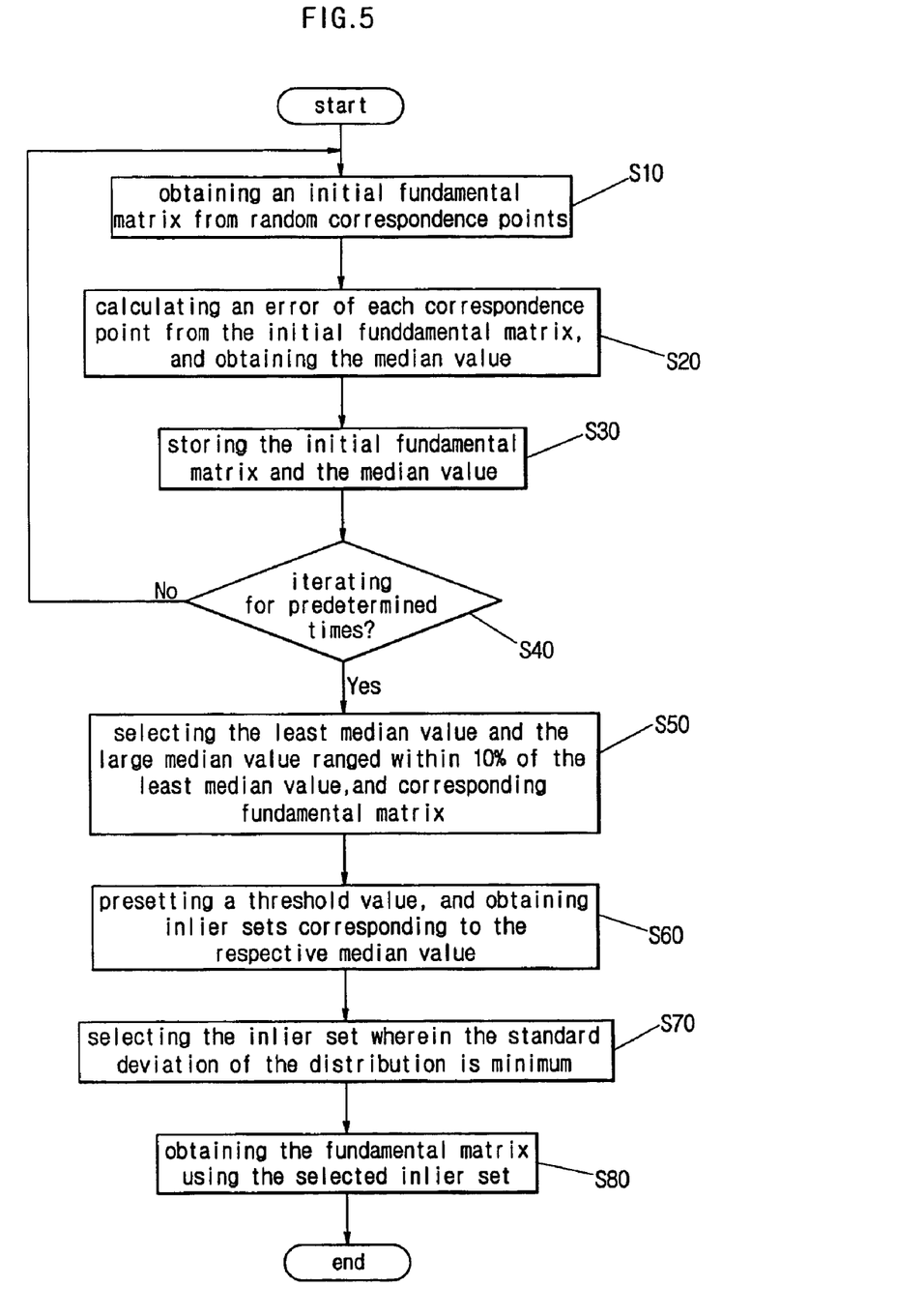
FIG. 5 is a flow chart for the process of the determining the fundamental matrix according to the present invention.

Hereinafter, referring to FIG. 5, the method of the present invention is explained.

In order to select effective inlier set wherein the correspondence points are evenly distributed, the present method using LMedS method to chooses the fundamental matrix with the least median of error. Then, in order to select the evenly distributed point sets, the quantitative measure is used.

First, a predetermined number of random correspondence points are selected, and then an initial fundamental matrix by linear method (S10).

Then, an error of each correspondence point from the initial fundamental matrix is calculated, and the median value of the set of the calculated errors is obtained (S20).

Then, the initial fundamental matrix and the median value according to the fundamental matrix are stored (S30).

Then, for N times according to the following Equation 3, the steps of obtaining the initial fundamental matrix and its median value are iterated (S40):

$$N = \log(1-P)/\log(1-(1-\epsilon)^q) \quad \text{[Equation 3]}$$

where, $\epsilon$ is the ratio of the outlier to all points;

q is the number of the sample points, preferably 7 or 8; and

P is the probability that these points are the inliers in sampling q points at N times. In general, P is determined as a value near 1.

Then, using the LMedS method, the least median value is selected. Further, the larger median value ranged within predetermined extent, e.g., 10% of the minimum median value among the stored median value, and corresponding fundamental matrix are also selected (S50).

According to the LMedS method, a threshold value may be calculated from the median value. The Equation 4 is used:

$$\tau = 2.5 \times 1.4826[1+5/(p-q)]\sqrt{\text{Median}} \quad \text{[Equation 4]}$$

where, p is the number of correspondence points, q is the number of the sample points, preferably 7 or 8; and Median is the median value.

After, the threshold value is preset as above, inlier sets corresponding to the respective median value selected in step (S50) using the corresponding threshold value and the initial fundamental matrix.

Then, for the inlier set selected in step (S60) the degree of distribution is examined using point density method or area density method. The standard deviation is calculated, and the inlier set wherein the standard deviation of the distribution is minimum is selected. The less the standard deviation is, the more uniformly the correspondence points are distributed.

Then, the fundamental matrix is obtained from the inlier set selected in the step (S70) using iterative method.

Hereinafter, the precision of the fundamental matrix obtained according to the present invention and LMedS method is compared.

We have compared the experimental results of previous method of LMedS method with the present invention on synthetic image and the real image. In order to check whether an optimal solution is obtained in terms of the median error minimization, we compute a real epipole on the synthetic image, and obtain the distance error between the real and the epipole by the LMedS method.

In this simulation, we can freely control the camera parameters and motion, and the real epipole and the fundamental matrix of the synthetic images are computed precisely. The following Table 1 shows the obtained epipoles with the smallest five medians on the synthetic image pair:

TABLE 1

|  | Median Value | x | y | Distance Error | Present Method SD. Eq. 6 | Present Method SD. Eq. 7 |
|---|---|---|---|---|---|---|
| Calibration |  | 380.5 | 180.2 |  |  |  |
| Case 1 | 0.01385 | 389.4 | 189.18 | 12.64 | 1.2157 | 82343.09 |
| Case 2 | 0.02252 | 380.12 | 183.17 | 2.99 | 1.1742 | 81594.95 |
| Case 3 | 0.02668 | 382.6 | 186.87 | 6.99 | 1.2278 | 82778.39 |
| Case 4 | 0.03349 | 378.47 | 184.3 | 4.57 | 1.2398 | 83923.28 |
| Case 5 | 0.04224 | 392 | 179.24 | 11.54 | 1.2238 | 82715.67 |

In Table 1, x and y represent the epipole position, and "distance error" describes a distance error between the real epipole and the computed epipole.

The simulation results show that the median minimization approach always does not guarantee a precise solution. In other words, as shown in Table 1, although the least median value in x and y is obtained in case 1, we can not always obtain a precise fundamental matrix. Table 1 shows the method of the present invention obtains the smallest values in case 2, so we can compute a more precise epipole in terms of the distance error.

Figure 6A:
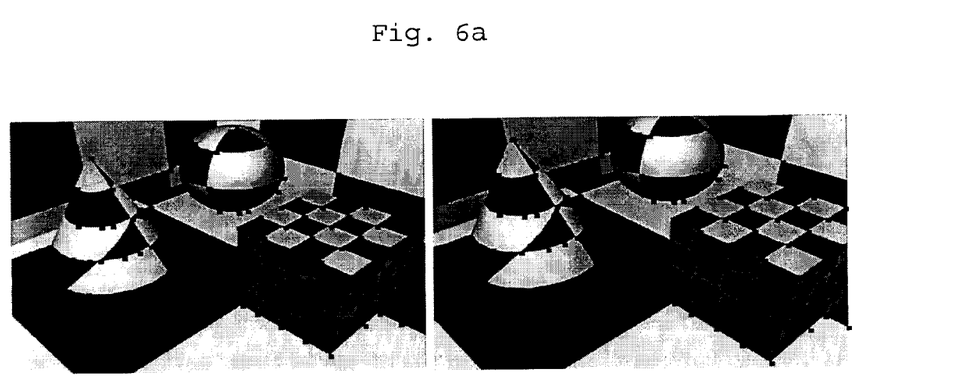
FIG. 6a illustrates all the correspondence points in the two images, a right image and a left image
Figure 6B:
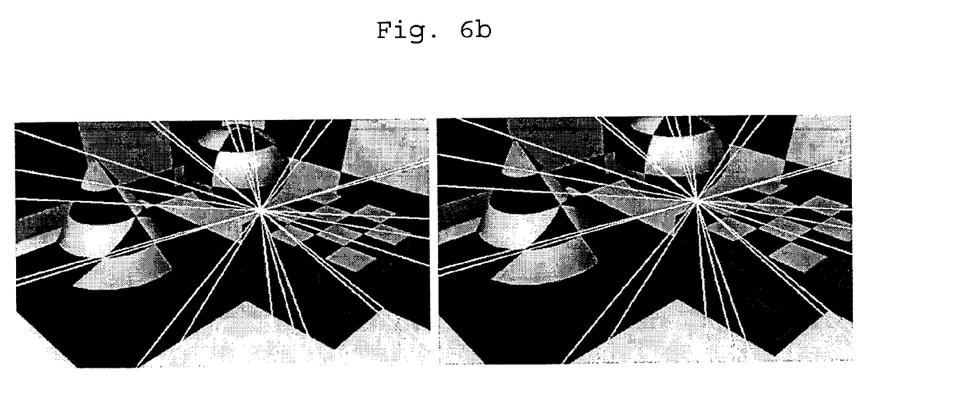
FIG. 6b illustrates epipolar lines and epipoles obtained from the present invention and LMedS method, respectively.

FIG. 6a shows the all the correspondence points in the right images and the left images. FIG. 6b shows the inlier set and the obtained epipolar lines on the synthetic image pair.

Figure 6C:
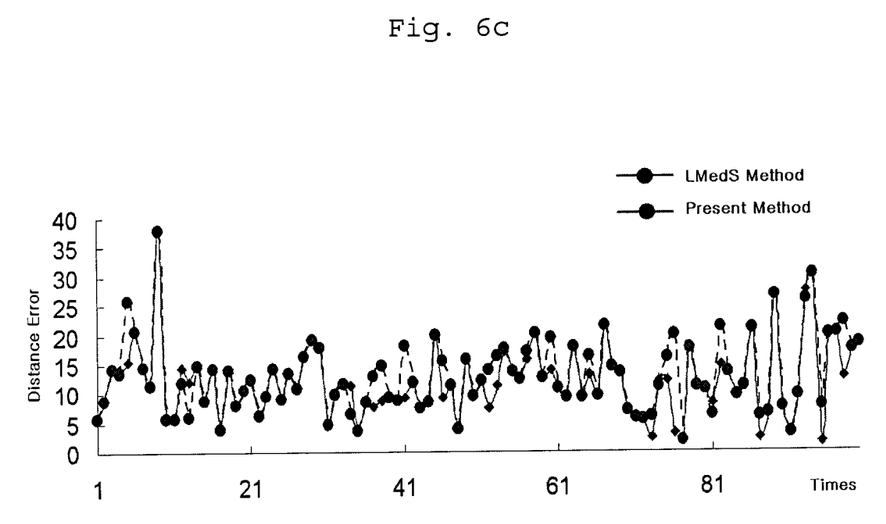
FIG. 6c illustrates the distance error with respect to the epipole in the experiments according to the present invention and LMedS method, respectively.
Figure 6D:
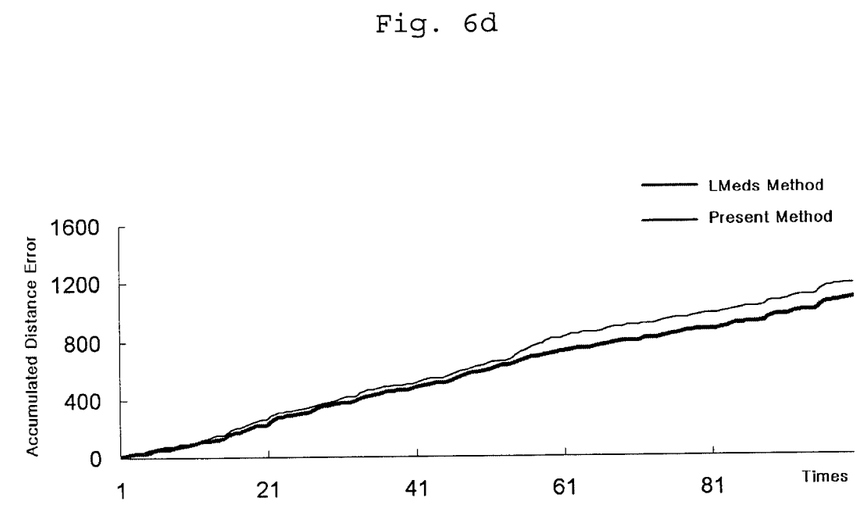
FIG. 6d illustrates the accumulated error as time elapsed in the experiments according to the present invention and LMedS method, respectively.

FIG. 6c represents the distance errors in case of the present invention and in case of LMedS method computed on 100 iterations. FIG. 6d represents the accumulated distance errors. In FIGS. 6c and 6d, the dot line in blue and the solid line in red represent the distance error or the accumulated distance error of the present method and the LMedS method, respectively.

From the experiment result, it can be noted that the error in the present method is less that that in the LMedS method. That is, the present method obtains the best performance over previous methods because of the consideration of the inlier distribution.

Figure 7A:
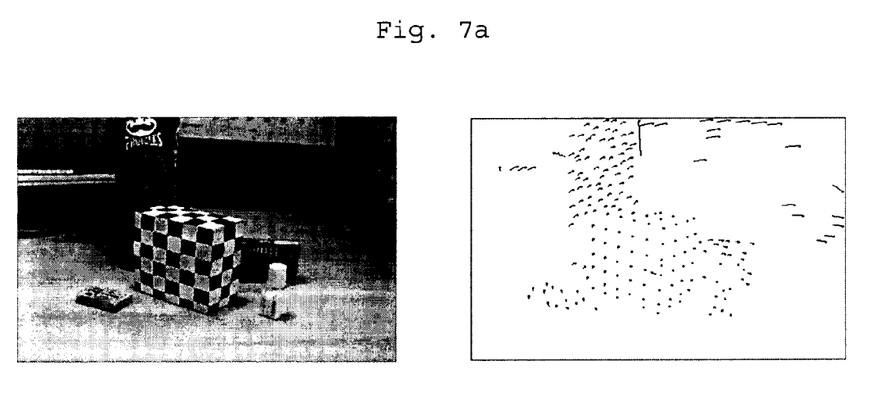
FIG. 7a show all the correspondence points in the real image.
Figure 7B:
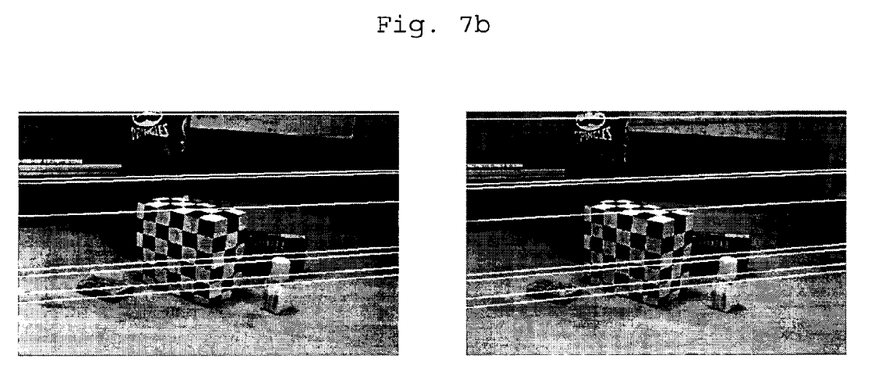
FIG. 7b illustrates each epipolar lines in the right image and the left image obtained by camera correction.
Figure 7C:
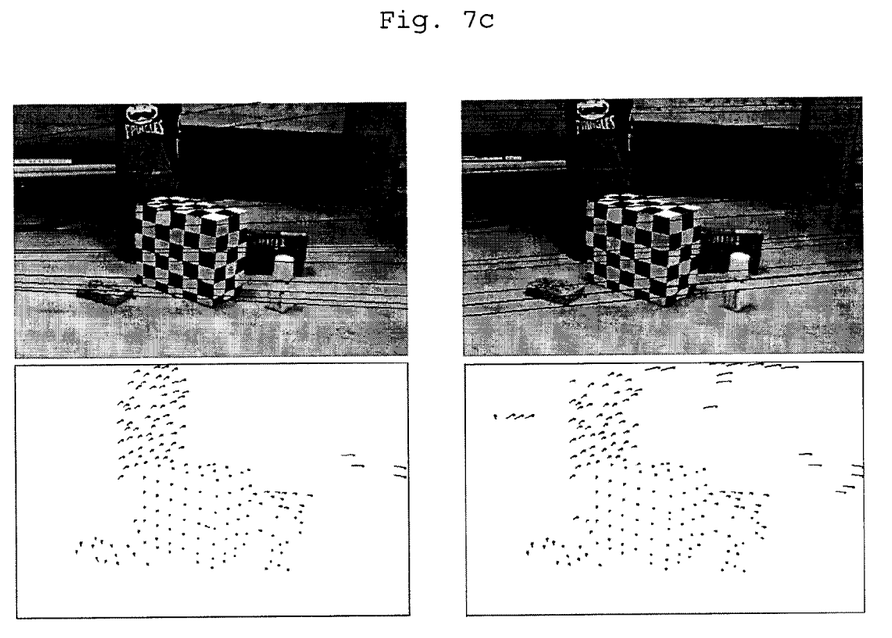
FIG. 7c illustrates the stream of the selected inliers and epipolar lines in the experiment according to the present invention and LmedS method.

FIGS. 7a to 7c shows the experimental results on real image.

FIG. 7a shows a calibration rig image (left) and all of the corresponding point flows (right) by matching based on SSD(sum of square difference)

FIG. 7b represents epipolar lines by camera calibration.

Epipolar lines and the selected inlier set flows by LMedS (left) and those by the present method (right) are shown in FIG. 7c.

In the experiment, because the LMedS considers only error, many points located on the right and upper sides are lost. These points are important for camera motion analysis, so the results by LMedS are not precise as shown in right image of FIG. 7c. In comparison of the experimental results on the real image, we have ascertained that the present method can select the evenly distributed inliers and estimate the fundamental matrix more precisely.

For the estimation of an accurate fundamental matrix, it is important to select the inlier sets that reflect the structure and the variation of the image due to camera motion. Previous methods often use the least errors to select the inliers. However, the experimental results show that the median minimization does not always guarantee a precise solution. The method according to the present invention shows that if the evenly distributed inliers are selected, we can estimate a more precise fundamental matrix.

Two quantitative measures to select evenly distributed points by considering the inlier distribution in an entire image are presented. According to the present invention, the entire image is divided into the sub-regions, and then the number of the inliers in each sub-region and the area of each region are examined. The experimental results on synthetic and real images show that the consideration of the inlier distribution can provide a more precise estimation of the fundamental matrix. These methods can be used as a base for further work on camera pose estimation and 3D scene geometry recovery.

What is claimed is:

1. A method for estimation of a fundamental matrix by selecting a set of correspondence points in the camera images to obtain the relative geometrical information for the two cameras in implementing a stereo vision, the method comprising the steps of:

(a) selecting a predetermined number of random correspondence points, and then obtaining an initial fundamental matrix by linear method;

(b) calculating an error of each correspondence point from the initial fundamental matrix, and obtaining the median value of the set of the calculated errors;

(c) iterating for predetermined times the steps of (a) and (b), and storing the initial fundamental matrix and the median value according to the initial fundamental matrix for each iteration;

(d) selecting the least median value and the larger median value ranged within about 10% of the least median value among the stored median value, and corresponding fundamental matrix;

(e) presetting a threshold value corresponding to the respective selected median value, and obtaining inlier sets corresponding to the respective median value using the corresponding threshold value and the initial fundamental matrix;

(f) selecting the inlier set wherein the standard deviation of the distribution of the inlier set is minimum; and (g) obtaining the fundamental matrix using the selected of inlier set.

2. The method according to claim 1, wherein the relation of the correspondence point x and x' in the respective camera images, and the fundamental matrix F is as Equation 1:

$$x'^{T}Fx=0 \qquad \text{[Equation 1]}.$$

3. The method according to claim 1, wherein the number of random correspondence points to be selected for obtaining an initial fundamental matrix in step (a) is 7 or 8.

4. The method according to claim 1, wherein the error r of correspondence point in step (b) is calculated according to the Equation 2, and the median value means the value located in the middle among the errors arranged in the order of magnitude:

$$r=d(x, F^{T}x')+d(x', Fx) \qquad \text{[Equation 2]}$$

where d(x, l) is the distance between a point x and a line l.

5. The method according to claim 1, wherein The number of iteration of steps (a) and (b) in the step (c) is determined by the following Equation 3:

$$N=\log(1-P)/\log(1-(1-\epsilon)^{q}) \qquad \text{[Equation 3]}$$

where, $\epsilon$ is the ratio of the outlier to all points;

q is the number of the sample points; and

P is the probability that these points are the inliers in sampling q points at N times.

6. The method according to claim 1, wherein the threshold value in the step (e) is obtained according to the Equation 4:

$$\tau=2.5\times1.4826[1+5/(p-q)]\sqrt{\text{Median}} \qquad \text{[Equation 4]}$$

where, p is the number of correspondence points, q is the number of the sample points; and Median is the median value.

7. The method according to claim 1, wherein, the image is divided into sub-regions in step (f), and the standard deviation means the distribution degree regading point density or area density of correspondence points in the sub-regions.

8. The method according to claim 7, wherein the image divided into sub-regions by Equation 5, and the standard deviation of point density that represents a degree of the point distribution in each sub-region relative to the entire image is calculated by Equation 6:

$$W_{s}=W/int(\sqrt{N})$$

$$H_{s}=H/int(\sqrt{N}) \qquad \text{[Equation 5]}$$

$$\sigma_p = \sqrt{\frac{1}{S_N} \sum_{i=1}^{S_N} \left(P_{Ni} - \frac{N}{S_N}\right)^2} \qquad \text{[Equation 6]}$$

where,
N is the number of the inliers,
int(•) means conversion to integer,
$W_s$ and $H_s$ are the height and the width of the sub-regions,
W and H are the height and the width of the image,
$S_N$ is the number of sub-regions, and
$P_{Ni}$ is the number of inliers in the i-th sub-region.

9. The method according to claim 7, wherein the image is divided into sub-regions in the shape of triangle using the Delaunay triangulation, and the standard deviation of the area density is calculated as Equation 8:

$$\sigma_A = \sqrt{\frac{1}{N_T} \sum_{i=1}^{N_T} \left(A_i - A_{aver}\right)^2} \qquad \text{[Equation 8]}$$

where,
$A_i$ is the area of i-th triangle,
$N_T$ is the number of triangles by Delaunay triangulation, and
$A_{aver}$ is the average area wherein the total area of whole image is divided by the number of triangles.

10. The method according to claim 1, wherein the fundamental matrix is obtained using iterative method from the inlier set selected in the step (g).

* * * * *